US009866497B2

United States Patent
Su et al.

(10) Patent No.: US 9,866,497 B2
(45) Date of Patent: Jan. 9, 2018

(54) LOSSLESS ADJUSTMENT METHOD OF ODUFLEX CHANNEL BANDWIDTH AND ODUFLEX CHANNEL

(71) Applicant: Huawei Technologies Co., Ltd., Shenzhen (CN)

(72) Inventors: Wei Su, Amsterdam (NL); Chiwu Ding, Chengdu (CN); Limin Dong, Shenzhen (CN); Qiuyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/931,533

(22) Filed: Nov. 3, 2015

(65) Prior Publication Data
US 2016/0057078 A1 Feb. 25, 2016

Related U.S. Application Data (63) Continuation of application No. 13/315,525, filed on Dec. 9, 2011, now Pat. No. 9,209,922, which is a
(Continued)

(51) Int. Cl.
*H04L 12/911* (2013.01)
*H04J 3/16* (2006.01)
(Continued)

(52) U.S. Cl.
CPC .......... *H04L 47/826* (2013.01); *H04J 3/1652* (2013.01); *H04J 3/1664* (2013.01);
(Continued)

(58) Field of Classification Search
CPC .... H04J 3/1605–3/167; H04J 2203/005; H04J 2203/0055;
(Continued)

(56) References Cited

U.S. PATENT DOCUMENTS

2006/0067242 A1    3/2006  Bi et al.
2006/0104309 A1*   5/2006  Vissers ................. H04J 3/1658
                                                        370/474
(Continued)

FOREIGN PATENT DOCUMENTS

CN    1685671 A    10/2005
CN    1734986 A    2/2006
(Continued)

OTHER PUBLICATIONS

Garner, "Timing Domains and Timing-Related Processes in an OTN Network Element," Study Group 15-Contribution 69, Telecommunication Standardization Sector, pp. 1-12, International Telecommunication Union, Geneva, Switzerland (Nov. 2008).
(Continued)

*Primary Examiner* — Eric Myers
(74) *Attorney, Agent, or Firm* — Leydig, Voit & Mayer, Ltd.

(57) ABSTRACT

The embodiments of the present disclosure relate to the field of communications technologies, and disclose a lossless adjustment method of ODUflex channel bandwidth and ODUflex channel. The lossless adjustment method includes: respectively adjusting, according to bandwidth adjustment indication request information, a time slot occupied by an ODUflex frame in a higher order optical channel data unit at an egress side of each network node on an ODUflex channel; and adjusting, according to rate adjustment indication information, a transmission rate of the ODUflex frame of each network node on the ODUflex channel, to enable the transmission rate of each network node on the ODUflex channel to be unified.

18 Claims, 6 Drawing Sheets

Related U.S. Application Data continuation of application No. PCT/CN2009/072185, filed on Jun. 9, 2009.

(51) Int. Cl.
  *H04Q 11/00* (2006.01)
  *H04L 12/919* (2013.01)

(52) U.S. Cl.
  CPC ....... *H04L 47/765* (2013.01); *H04Q 11/0066* (2013.01); *H04J 2203/0067* (2013.01); *H04J 2203/0098* (2013.01); *H04Q 2011/0086* (2013.01)

(58) Field of Classification Search
  CPC .................. H04J 2203/0057–2203/006; H04J 2203/0064–2203/0071; H04J 2203/0091; H04J 2203/0098
  See application file for complete search history.

(56) References Cited

U.S. PATENT DOCUMENTS

| | | |
|---|---|---|
| 2006/0245357 A1 | 11/2006 | Ilan |
| 2007/0071443 A1 | 3/2007 | Fukumitsu et al. |
| 2007/0104485 A1 | 5/2007 | Zhang |
| 2007/0201462 A1 | 8/2007 | Ilan |
| 2007/0248121 A1 | 10/2007 | Zou |
| 2008/0101377 A1 | 5/2008 | Kundu et al. |
| 2010/0054731 A1* | 3/2010 | Oltman ............... H04J 3/14 398/1 |
| 2012/0002965 A1 | 1/2012 | Bellato et al. |
| 2014/0334503 A1 | 11/2014 | Dong et al. |
| 2015/0215060 A1 | 7/2015 | Zou |

FOREIGN PATENT DOCUMENTS

| | | |
|---|---|---|
| CN | 1756143 A | 4/2006 |
| CN | 1790993 A | 6/2006 |
| CN | 101039333 A | 9/2007 |
| CN | 101179351 A | 5/2008 |
| CN | 101291179 A | 10/2008 |
| RU | 2301499 C1 | 6/2007 |
| RU | 2364040 C2 | 8/2009 |
| WO | WO 2004028095 A1 | 4/2004 |

OTHER PUBLICATIONS

Vissers, "Ethernet services supporting transport networks, their standardization and future development," Huawei Tech. Co., Ltd. (Feb. 10, 2009).

"Series G: Transmission Systems and Media, Digital Systems and Networks; Digital terminal equipments-General; Series Y: Global Information Infrastructure, Internet Protocol Aspects and Next Generatioin Networks; Internet protocol aspects—Transport; Interfaces for the Optical Transport Networks (OTN)," ITU-T Recommendation G.709/Y.1331, pp. i-109, International Telecommunication Union, Geneva, Switzerland (Mar. 2003).

Jones, "Report of Interim Q11/15 Meeting," Q11/15 Rapporteur, pp. 1-10, Sunnyvale, California (Mar. 16-20, 2009).

Gao, "Bandwidth on Demand Service and Its Implementation," ZTE Communications, vol. 12, Issue 6, pp. 19-22, Beijing Research Institute of ZTE Corporation, Beijing, China (Dec. 2006).

* cited by examiner

LOSSLESS ADJUSTMENT METHOD OF ODUFLEX CHANNEL BANDWIDTH AND ODUFLEX CHANNEL

CROSS-REFERENCE TO RELATED APPLICATIONS

This application is a continuation of U.S. patent application Ser. No. 13/315,525, filed Dec. 9, 2011, which is a continuation of International Patent Application No. PCT/CN2009/072185, filed Jun. 9, 2009. The afore-mentioned patent applications are hereby incorporated by reference in their entireties.

FIELD OF THE DISCLOSURE

The present disclosure relates to the field of communications technologies, and in particular, to a lossless adjustment method of ODUflex channel bandwidth and an ODUflex channel.

BACKGROUND OF THE DISCLOSURE

An OTN (Optical transport network), as a core technology of a next generation transport network, is capable of implementing flexible scheduling and management of high-capacity services, and increasingly becomes a mainstream technology of a backbone transport network.

With the rapid development of data services, the current OTN system can no longer well satisfy the requirement of directly bearing multiple services with various rates. Aiming at the requirement, the ITU-T is discussing about formulating a new ODUflex frame to satisfy the requirement. The ODUflex frame may bear a packet service at any rate, and in this case, the ODUflex rate is opted to be $n*1.24416$ G, where $1 \leq n \leq 80$. Since the ODUflex frame cannot directly pass a line interface, but needs to be encapsulated to an HO ODU (Higher Order Optical Channel Data Unit) and to be transported through the HO OTU (Higher Order Optical Channel Transport Unit). A current mapping manner of an ODUflex frame to an HO ODU uses the GMP (Generic Mapping Procedures), where the ODUflex occupies some time slots of the HO ODU.

A packet service traffic has a property of non-real time changing, so in different time periods, the ODUflex is required to provide various bandwidth to satisfy various packet service traffic, and is required not to affect the normal transmission of the packet service while ODUflex channel bandwidth is adjusted.

Therefore, how to achieve the lossless adjustment of ODUflex channel bandwidth has become a practical problem that is required to be solved while a packet service is borne through an ODUflex.

SUMMARY OF THE DISCLOSURE

Embodiments of the present disclosure provide a lossless adjustment method of ODUflex channel bandwidth and an ODUflex channel. When an ODUflex is used to bear a packet service and when packet service traffic changes, ODUflex channel bandwidth can be adjusted without affecting normal transmission of the packet service. In order to achieve the objectives, the embodiments of the present disclosure adopt the following technical solutions.

An embodiment of the present disclosure provides a lossless adjustment method of ODUflex channel bandwidth, which includes:

adjusting, according to bandwidth adjustment indication request information, a time slot occupied by an ODUflex frame in a Higher Order Optical Channel Data Unit at an egress side of each network node on an ODUflex channel; and adjusting, according to rate adjustment indication information, a transmission rate of an ODUflex frame of each network node on an ODUflex channel, to enable the transmission rate of each network node on the ODUflex channel to be unified.

An embodiment of the present disclosure provides an ODUflex channel, which includes: a source network node, at least one intermediate network node and a destination network node. The source network node is configured to create bandwidth adjustment indication information and rate adjustment indication information, where the bandwidth adjustment indication information and the rate adjustment indication information are encapsulated in an HO ODU overhead or an ODUflex overhead to be transmitted to the intermediate network node and the destination network node.

The source network node, intermediate network node and destination network node are configured to respectively adjust, according to the bandwidth adjustment indication request information, a time slot occupied by an ODUflex frame in a Higher Order Optical Channel Data Unit at an egress side.

The source network node, intermediate network node and destination network node are configured to adjust, according to the rate adjustment indication information, a transmission rate of an ODUflex frame.

The technical solutions provided in the embodiments of the present disclosure achieve a lossless adjustment of ODUflex channel bandwidth by respectively adjusting a time slot occupied by an ODUflex frame in a Higher Order Optical Channel Data Unit at an egress side of each network node on an ODUflex channel, and adjusting a transmission rate of an ODUflex frame of each network node on the ODUflex channel.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only about some embodiments of the present disclosure, and persons of ordinary skill in the art can derive other drawings from the accompanying drawings without creative efforts.

DETAILED DESCRIPTION OF THE EMBODIMENTS

The technical solutions of embodiments of the present disclosure will be clearly and comprehensively described in the following with reference to the accompanying drawings of the embodiments of the present disclosure. It is obvious that the embodiments to be described are only a part rather than all of the embodiments of the present disclosure. All other embodiments obtained by persons of ordinary skills in the art based on the embodiments of the present disclosure without creative efforts shall fall within the protection scope of the present disclosure.

Figure 1:
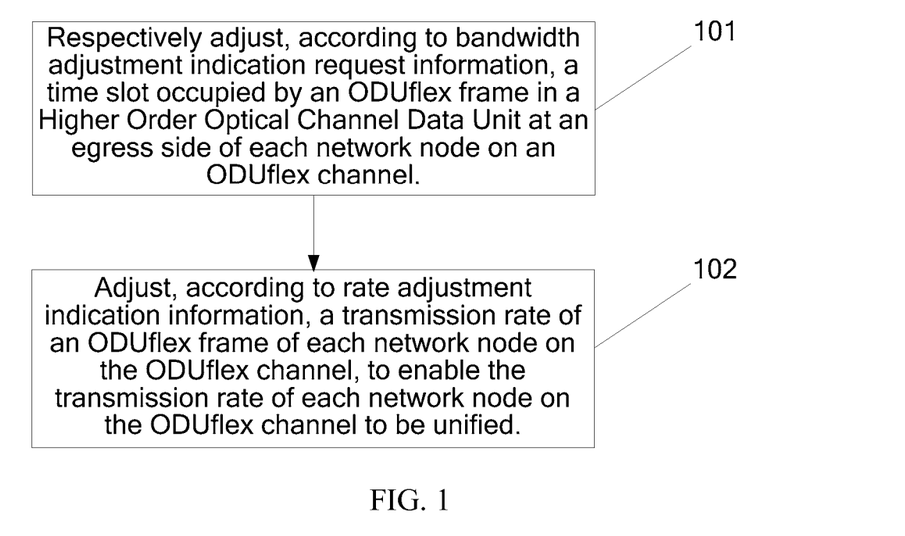
FIG. 1 is a flowchart of a lossless adjustment method of ODUflex channel bandwidth according to an embodiment of the present disclosure.

As shown in FIG. 1, an embodiment of the present disclosure provides a lossless adjustment method of ODUflex channel bandwidth, which includes the following steps:

Step 101: Respectively adjust, according to bandwidth adjustment indication request information, a time slot occupied by an ODUflex frame in a Higher Order Optical Channel Data Unit at an egress side of each network node on an ODUflex channel.

Step 102: Adjust, according to rate adjustment indication information, a transmission rate of an ODUflex frame of each network node on the ODUflex channel, to enable the transmission rate of each network node on the ODUflex channel to be unified.

In the lossless adjustment method of ODUflex channel bandwidth provided in the embodiment of the present disclosure, the order of step 101 and step 102 is not fixed, that is, the executing order of step 101 and step 102 may be adjusted according to an increase or a decrease of packet service traffic.

The lossless adjustment method of ODUflex channel bandwidth provided in the embodiment of the present disclosure achieves the lossless adjustment of ODUflex channel bandwidth by respectively adjusting a time slot occupied by an ODUflex frame in a Higher Order Optical Channel Data Unit at an egress side of each network node on an ODUflex channel, and adjusting a transmission rate of an ODUflex frame of each network node on the ODUflex channel.

In order to describe the present disclosure more clearly, technical solutions provided in the present disclosure will be described through specific embodiments in the following.

Figure 2:
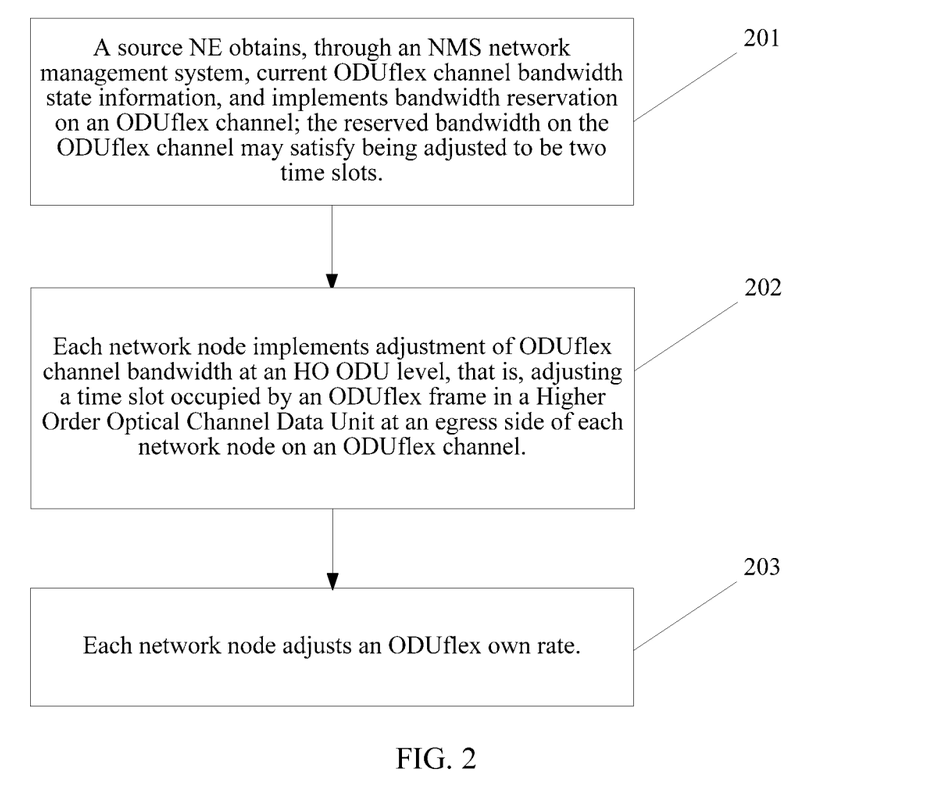
FIG. 2 is a flowchart of a lossless adjustment method of ODUflex channel bandwidth according to an embodiment of the present disclosure.

As shown in FIG. 2, an embodiment of the present disclosure provides a lossless adjustment method of ODUflex channel bandwidth with main steps in the following:

In the embodiment of the present disclosure, an example that packet service traffic is increasing is taken for description. It is assumed that an ODUflex originally occupies one time slot, and since the packet service traffic is increasing, two time slots are required to be occupied currently. By using the technical solutions of the present disclosure, a whole process of adjusting ODUflex channel bandwidth is in the following.

Step 201: A source NE obtains, through a NMS (Network Management System), current ODUflex channel bandwidth state information, and implements bandwidth reservation on an ODUflex channel; the reserved bandwidth on the ODUflex channel may satisfy being adjusted to be two time slots; if the bandwidth reservation is successful, a next operation is performed; otherwise, the source NE reports the information about unsuccessful bandwidth reservation.

Step 202: Each network node implements adjustment of the ODUflex channel bandwidth at an HO ODU level, that is, adjust a time slot occupied by an ODUflex frame in a Higher Order Optical Channel Data Unit at an egress side of each network node on the ODUflex channel.

Operations of a Source NE (Network Node):

1. Bandwidth adjustment indication request information is generated. The bandwidth adjustment indication request information and its encapsulation manner in the embodiment of the present disclosure may be applicable to the situation in FIG. 3. Bandwidth adjustment indication information used in the processing of adjusting the ODUflex channel bandwidth in an HO ODU is BAI (Bandwidth Adjustment Identifier) information which mainly includes: a BI/BD (Bandwidth Increase/Bandwidth Decrease, which indicates an increase or a decrease of ODUflex channel bandwidth), a BC (Bandwidth Capacity, which indicates the number of time slots that are occupied by an ODUflex), and a BBAI (Backward Bandwidth Adjustment Identifier, which returns an ODUflex channel bandwidth adjustment complete indication). When the ODUflex channel bandwidth is required to be increased, the BI/BD is "1010", the BC is the number of time slots that are required to be occupied by the ODUflex; when the ODUflex channel bandwidth is required to be decreased, the BI/BD is "0101", the BC is the number of time slots that are required to be occupied by the ODUflex; under a normal situation, the BI/BD is "0000", the BC is the number of time slots that are practically occupied currently; when the processing of adjusting the ODUflex channel bandwidth in the HO ODU is completed, a destination network node returns a BBAI to a source network node, in this case, the BBAI is 1; under the normal situation, the BBAI is 0.

Figure 3:
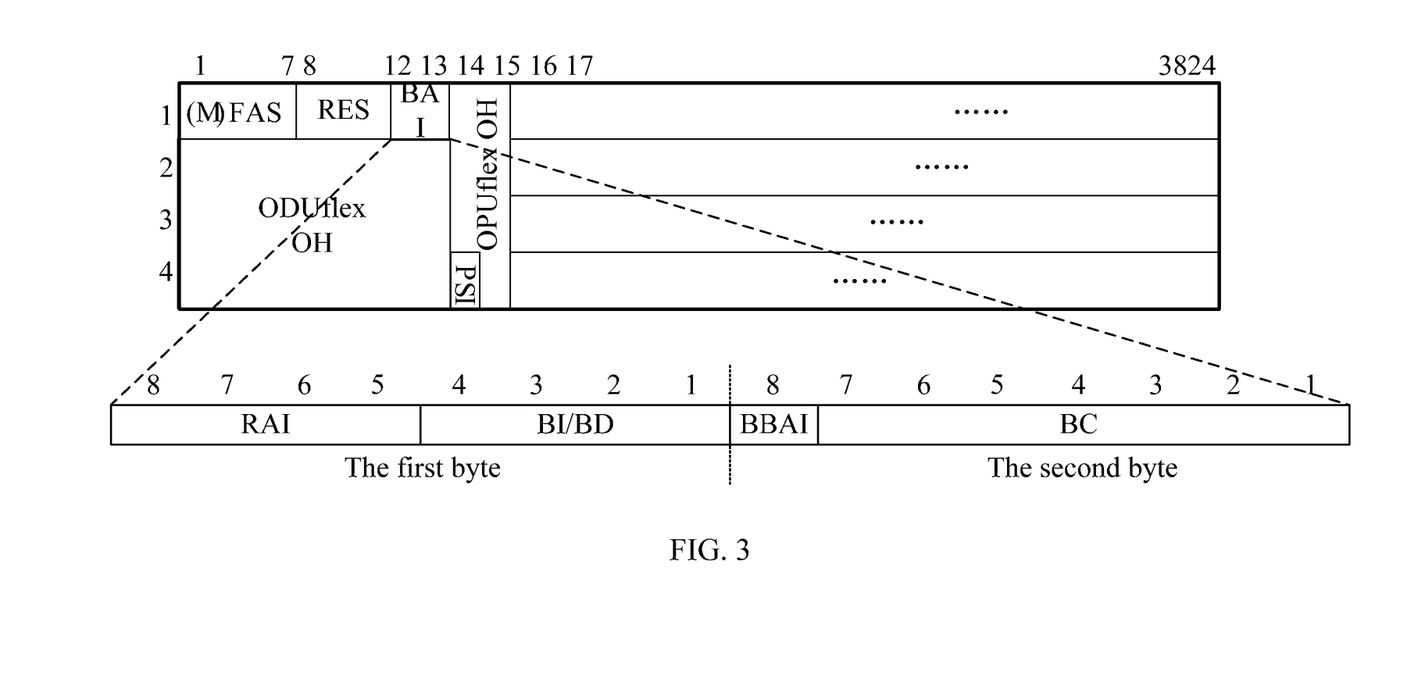
FIG. 3 is a structural diagram of an ODUflex frame that encapsulates bandwidth adjustment indication information according to an embodiment of the present disclosure.

Where, an RAI (Rate Adjustment Identifier) is BAI information that is used for ODUflex own rate adjustment.

When an ODUflex rate is required to be adjusted, that is, an increase or a decrease of the rate, the RAI is "1010"; when the ODUflex rate adjustment is completed, the RAI is "0101"; and under the normal situation, the RAI is "0000".

The BAI information and its encapsulation manner in the technical solutions of the present disclosure are not limited to the manners that are described above. The BAI information may further include some other information, such as CRC check information. An encapsulation location of the BAI information is not limited to bytes 13 and 14 of a first line, and may be placed in any reservation location in an ODUflex overhead, or may be placed in an HO ODU overhead.

In the embodiment of the present disclosure, the BI/BD is "1010" and the BC is 2, which indicates that the ODUflex channel bandwidth is required to be increased to be two TSs. The bandwidth adjustment indication request information is encapsulated into the ODUflex overhead to be sent out.

2. The source network node indicates, through a PSI (Payload structure identifier) that, allocating, by the HO ODU, the two TSs that are required to be occupied by the ODUflex in the network node is to be completed.

Figure 4:
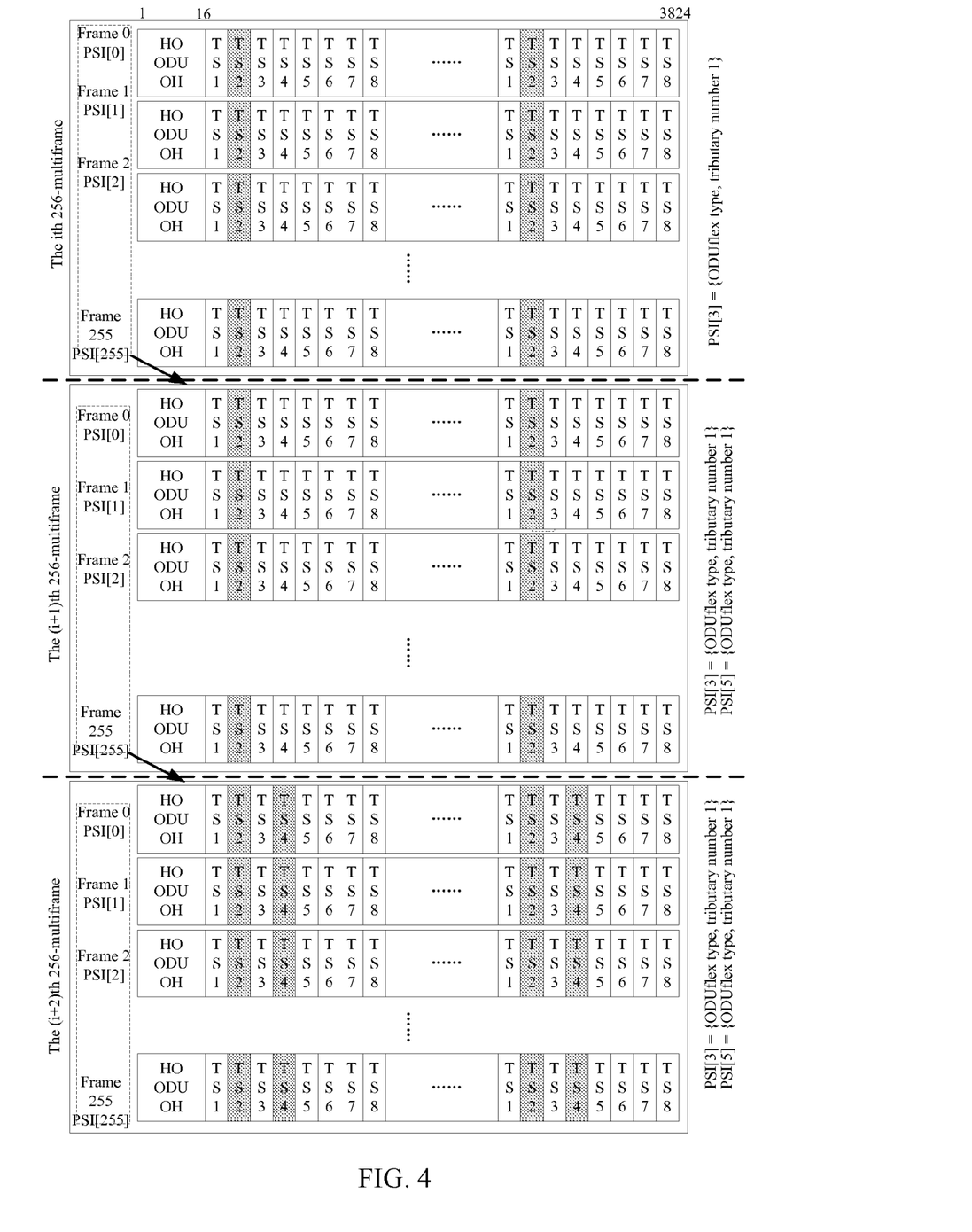
FIG. 4 is schematic diagram of utilizing a PSI to reallocate a time slot occupied by an ODUflex in an HO ODU at an egress side of a network node according to an embodiment of the present disclosure.

When the ODUflex channel bandwidth in the HO ODU is required to be adjusted, it may be indicated, through a 256-multiframe PSI, that reallocating a TS (Time Slot) to the ODUflex is to be completed; and a condition of occupying the TS by the ODUflex is switched in a next 256-multiframe.

An example that a case that the ODUflex originally occupies one TS in the HO ODU is adjusted to a case that the ODUflex occupies two TSs is taken for description, where the HO ODU is divided into 8 TSs. As shown in FIG. 4, in an $i^{th}$ 256-multiframe, an ODUflex occupies one TS, that is, TS 2. In this case, the ODUflex channel bandwidth is required to be adjusted, and it is indicated, through a PSI, in an $(i+1)^{th}$ 256-multiframe that the ODUflex will occupy two TSs in an $(i+2)^{th}$ 256-multiframe, that is, TS 2 and TS 4. However, in the $(i+1)^{th}$ 256-multiframe, the ODUflex still occupies only one TS, that is, TS 2. In the $(i+2)^{th}$ 256-multiframe, the condition of TSs occupied by an ODUflex is switched to be two, that is, TS 2 and TS 4.

In the adjustment process, since the ODUflex rate is kept unchanged, and only a container that bears the ODUflex is increased, the number of ODUflexs that are borne in each frame of the HO ODU is kept unchanged, the number of ODUflexs that are de-mapped from the HO ODU is unchanged, and a cache to store the ODUflex is in a balanced state. Therefore, the performance of a restored ODUflex clock is not affected, and the adjustment is a lossless adjustment process.

During the above process, the reallocated TS switch time may also be in other manners in addition to switching the condition of TS occupied by an ODUflex in the next 256-multiframe. For example, based on GMP (Generic Mapping Procedures) payload block border, the condition of TS occupied by an ODUflex is switched, and switching the condition of TS occupied by an ODUflex is triggered through an overhead carried in the GMP. That is, in the embodiment, before the switch, the GMP payload block occupies one TS; and after the switch, the GMP payload block occupies two TSs.

3. Wait till the time slot adjustment is completed, the BSI request information is modified to be normal, that is, the BI/BD is "0000", and the BC is 2; and the modified BAI request information, that is, bandwidth adjustment indication request complete information, is encapsulated into the ODUflex overhead to be sent out.

4. A BAI complete indication returned by the destination network node is detected; when three frames of ODUflexes are received continuously, and the BBAI is 1, it indicates that adjusting the ODUflex channel bandwidth at the HO ODU level is completed, that is, an ODUflex level may be triggered to start the ODUflex own rate adjustment.

In the embodiment of the present disclosure, it is preset that when adjustment of ODUflex channel bandwidth at an HO ODU level of a destination network node is completed, three frames of ODUflexes that are encapsulated with BAI complete indication are returned to a source network node. In other embodiments of the present disclosure, it may also be set that a destination network node returns, to a source network node, other frames of ODUflexes that are encapsulated with BAI complete indication, which is not limited here by the present disclosure.

Operations of an Intermediate NE

When the intermediate NE is required to de-map an ODUflex frame from an HO ODU:

1. The intermediate NE receives BAI information at an ingress side, where BI/BD is "1010" and BC is 2, and therefore it is perceived that the ODUflex channel bandwidth is required to be increased to be two TSs.

2. The BAI information is transparently transmitted immediately, and at an egress side, the BAI information with the BI/BD being "1010" and the BC being 2 is encapsulated into an ODUflex overhead to be sent out.

3. It is indicated, through a PSI, that the adjustment that the ODUflex is required to occupy two TSs in the HO ODU of the NE is to be completed.

4. After the adjustment is completed and the BAI information with the BI/BD being "1010" and the BC being 2 is no longer received; the BAI information is modified to be normal, that is, the BI/BD is "0000" and the BC is 2; and the modified BAI information is encapsulated to the ODUflex overhead to be sent out.

5. When the BBAI information from the destination network node is received, the BBAI information is transparently transmitted.

When the intermediate NE is not required to de-map an ODUflex frame from an HO ODU:

1. The intermediate NE directly transparently transmits the BAI information.

2. When the BBAI information from the destination network node is received, the BBAI information is transparently transmitted.

Operations of a Destination NE

1. The destination NE receives BAI information at an ingress side, where BI/BD is "1010" and BC is 2, and therefore it is perceived that the ODUflex channel bandwidth is required to be increased to be two TSs.

2. Wait till BAI information with the BI/BD being "1010" and the BC being 2 sent from an upstream NE is no longer received, a complete indication BBAI of the adjustment of the ODUflex channel bandwidth in an HO ODU, that is, BBAI being 1, is returned to the source NE. The information that the BBAI is 1 is encapsulated into an ODUflex overhead that has three continuous frames, and is to be sent out; afterward, the BBAI is modified to be normal, that is, the BBAI is 0.

Step 203: Each network node adjusts an ODUflex own rate.

Operations of a Source NE

1. Preprocessing of ODUflex rate adjustment mainly includes: triggering a reading-enabled capacity of a packet service cache to be ineffective; only caching a packet service, but not reading a packet service from the cache; and subsequently encapsulating invalid data to an ODUflex (such as encapsulating a GFP (Generic framing procedure) idle frame to an ODUflex), where the ODUflex no longer has valid data.

2. ODUflex rate increase indication RAI information, that is, RAI is "1010", is generated, and the information is encapsulated into an ODUflex overhead that has three continuous frames, and is to be sent out.

3. A ODUflex rate is adjusted, that is, an ODUflex clock is adjusted to be approximately two times of that of an original ODUflex so as to adjust the ODUflex rate to an expected rate.

4. Wait till the ODUflex clock adjustment is stabilized, ODUflex rate adjustment complete indication RAI information, that is, RAI is "0101", is generated, and the information is encapsulated into an ODUflex overhead that has three continuous frames, and is to be sent out, so as to indicate that the ODUflex rate adjustment is completed.

5. Processing after the ODUflex rate adjustment mainly includes: triggering the reading-enabled capacity of the packet service cache to be effective and obtain the packet service from the cache; and then encapsulating, through the GFP, the packet service to an ODUflex frame whose rate is adjusted.

6. In this case, the adjustment of the ODUflex channel bandwidth is completed; and the increase of packet service traffic may be triggered.

Operations of an Intermediate NE

When the intermediate NE is required to de-map an ODUflex frame from an HO ODU:

1. The intermediate network node transparently transmits rate adjustment indication information.

2. An ODUflex frame is de-mapped from a received HO ODU frame, and smooth processing is performed on the ODUflex frame so as to facilitate stability of a restored ODUflex clock after a ODUflex frame rate is adjusted.

3. The intermediate network node transparently transmits rate adjustment complete information.

Figure 5:
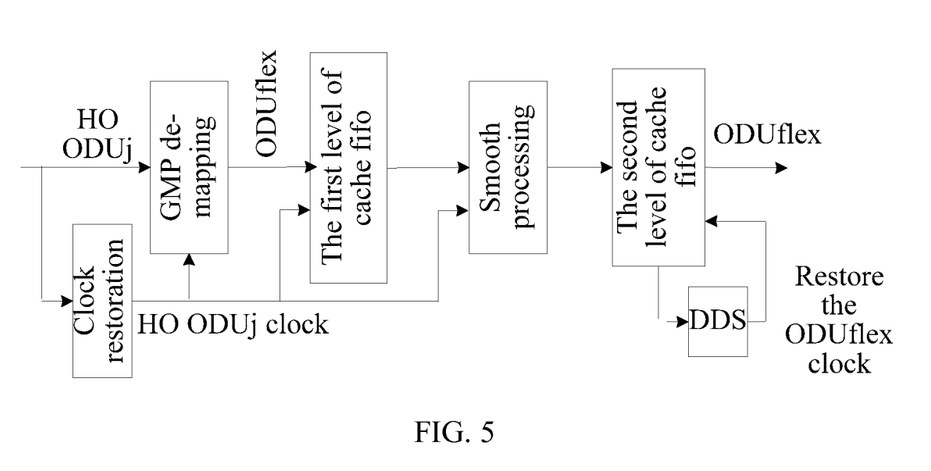
FIG. 5 is a schematic diagram of a smooth processing process according to an embodiment of the present disclosure.

In the embodiment of the present disclosure, the smooth processing during the ODUflex own rate adjustment process may adopt the following manner so as to remove the problem that the ODUflex clock that is restored during an ODUflex rate changing process is instable, thereby achieving lossless de-mapping of a packet service at a receiving end.

As shown in FIG. 5, the smooth processing process is implemented through two levels of caches.

Firstly, ODUflex data flow that is de-mapped from an HO ODU frame is stored to a first level of cache.

And then, in a uniform increasing or decreasing manner, the data in the first level of cache is stored to a second level of cache till both two levels of caches reach a balanced state.

Lastly, the ODUflex clock is restored according to the second level of cache.

In the technical solutions provided in the present disclosure, the smooth processing of the destination NE and the intermediate NE during the ODUflex own rate adjustment process is not limited to the methods described in the embodiment, and any other methods that are capable of achieving the same effect may also be applicable.

When the intermediate NE is not required to de-map an ODUflex frame from an HO ODU:

1. The intermediate network node transparently transmits rate adjustment indication information.

2. The intermediate network node transparently transmits rate adjustment complete information.

3. The intermediate network node transparently transmits the HO ODU.

Operations of a Destination NE

1. An ODUflex whose rate is increasing is de-mapped from an HO ODU.

2. Smooth transition processing is performed on the de-mapped ODUflex data flow to make the restored ODUflex clock stable so as to achieve the lossless de-mapping of an ODUflex.

3. Frame positioning and RAI identification processing are performed on the ODUflex data flow. When three frames of ODUflexes including a rate adjustment indication that the RAI is "1010" are received continuously, all subsequent ODUflex frames are discarded since data borne by the ODUflex in this case is invalid; the frame positioning is performed on the ODUflex data flow again till an ODUflex frame header is locked and three frames of ODUflexes including a rate adjustment complete indication that an RAI is "0101" are received continuously, de-mapping processing is performed on subsequent ODUflex frames since data borne by the ODUflex in this case is valid.

The embodiment of the present disclosure achieves the lossless adjustment of ODUflex channel bandwidth by respectively adjusting a time slot occupied by an ODUflex frame in a Higher Order Optical Channel Data Unit at an egress side of each network node on an ODUflex channel, and adjusting a transmission rate of an ODUflex frame of each network node on the ODUflex channel.

Figure 6:
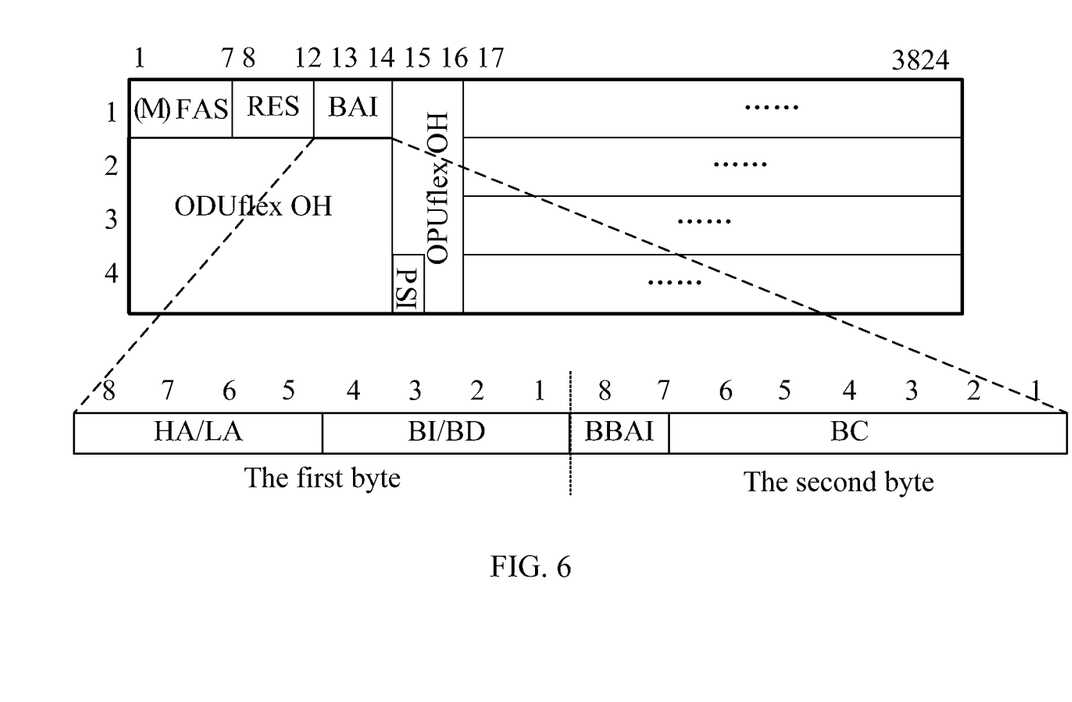
FIG. 6 is a structural diagram of an ODUflex frame that encapsulates rate adjustment indication information according to an embodiment of the present disclosure.

Further, an embodiment of the present disclosure also provides a lossless adjustment method of ODUflex channel bandwidth. In comparison with the above embodiment, the differences merely lie in that the steps of adjusting an ODUflex own rate by each network node, in which a placing manner of RAI information that is used in the ODUflex own rate adjustment is shown in FIG. 6. When an HA/LA (High Order/Low Order Adjustment Identifier) is "1010", it indicates BAI information which is used at an HO ODU level; when the HA/LA (High Order/Low Order Adjustment Identifier) is "0101", it indicates the RAI information which is used in the ODUflex own rate adjustment. The ODUflex own rate adjustment is described in the following, so the HA/LA is "0101".

Operations of a Source NE

1. Preprocessing of ODUflex rate adjustment mainly includes: triggering a reading-enabled capacity of a packet service cache to be ineffective; only caching a packet service, but not reading a packet service from the cache; and subsequently encapsulating invalid data into an ODUflex, where the ODUflex no longer includes valid data.

2. ODUflex rate increase indication RAI information is generated, that is, the BI/BD is "1010" and the BC is 2, and the information is encapsulated into an ODUflex overhead that has three continuous frames and is to be sent out.

3. The ODUflex rate is adjusted, that is, the ODUflex clock is adjusted to be approximately two times of that of an original ODUflex so as to adjust the ODUflex rate to an expected rate.

4. Wait till the ODUflex clock adjustment is stabilized, ODUflex rate adjustment complete indication RAI information, that is, BI/BD is "0000", is generated, and the information is encapsulated into an ODUflex overhead that has three continuous frames, and is to be sent out, so as to indicate that the ODUflex rate adjustment is completed in the NE.

5. An RAI complete indication returned by the destination NE is detected.

6. Processing after the ODUflex rate adjustment mainly includes that after the RAI complete indication returned from the destination NE, that is, the BBAI being 1, is received, the reading-enabled capacity of the packet service cache is triggered to be effective and the packet service is obtained from the cache; and then the packet service is encapsulated, through the GFP, to an ODUflex frame whose rate is adjusted.

7. In this case, adjusting the ODUflex channel bandwidth is completed; and the increase of packet service traffic may be triggered.

Operations of an Intermediate NE

When the intermediate NE is required to de-map an ODUflex frame from an HO ODU:

1. An ODUflex is de-mapped from an HO ODU.

2. Frame positioning and RAI identification processing are performed on an ODUflex flow. When three frames of ODUflex rate adjustment increase indication which includes that the BI/BD is "1010" are received, it indicates that a subsequent ODUflex data flow is invalid data that is generated during an ODUflex rate adjustment period; a rate level BC being 2 that is required by ODUflex to be adjusted is obtained; ODUflex clock adjustment is triggered according to an obtained ODUflex adjustment rate level, and the ODUflex rate is adjusted to an expected rate; and at the same time an ODUflex rate adjustment increase indication which includes that the BI/BD is "1010" is continued to be sent to a direction of a destination network node.

3. Wait till the ODUflex clock adjustment is stabilized and ODUflex rate adjustment complete indication information transmitted from an upstream is locked and identified, rate adjustment complete information is sent to indicate that the ODUflex rate adjustment of upstream NEs including the NE is completed.

4. The intermediate network node transparently transmits the rate adjustment complete information returned from the destination network node.

When the intermediate NE is not required to de-map an ODUflex frame from an HO ODU:

The intermediate network node transparently transmits rate adjustment indication information.

The intermediate network node transparently transmits rate adjustment complete information.

The intermediate network node transparently transmits an HO ODU.

The intermediate network node transparently transmits rate adjustment complete information returned from the destination network node.

Operations of a Destination NE

1. An ODUflex is de-mapped from an HO ODU.

2. Frame positioning and RAI identification processing are performed on the ODUflex flow. When three frames of ODUflex rate adjustment increase indication including that the BI/BD is "1010" are received continuously, it indicates that a subsequent ODUflex data flow is invalid data generated during an ODUflex rate adjustment period; a rate level BC being 2 that is required by the ODUflex to be adjusted is obtained; at the same time, the frame positioning processing on the ODUflex flow is triggered again till an ODUflex frame header is locked and three frames of ODUflex rate adjustment complete indication including that the BI/BD is "0101" are received continuously, it indicates that the ODUflex rate adjustment period of an upstream NE ends.

3. When an ODUflex rate adjustment indication that is transmitted from an upstream is locked and identified, ODUflex clock adjustment is triggered according to an obtained ODUflex adjustment rate level and the ODUflex rate is adjusted to an expected rate.

4. Wait till the ODUflex clock adjustment is stabilized and ODUflex rate adjustment complete indication RAI information which is transmitted from the upstream is locked and identified, an indication indicating that ODUflex rate adjustment of a whole channel is completed, that is, BBAI is 1, is returned to an source NE; and three frames are continuously returned.

In the embodiment of the present disclosure, rate adjustment is performed on a source node, an intermediate node and a destination node, the source node is notified after rates are kept stabilized, and the source node triggers a next operation, thereby achieving the lossless adjustment of ODUflex own rate.

Figure 7:
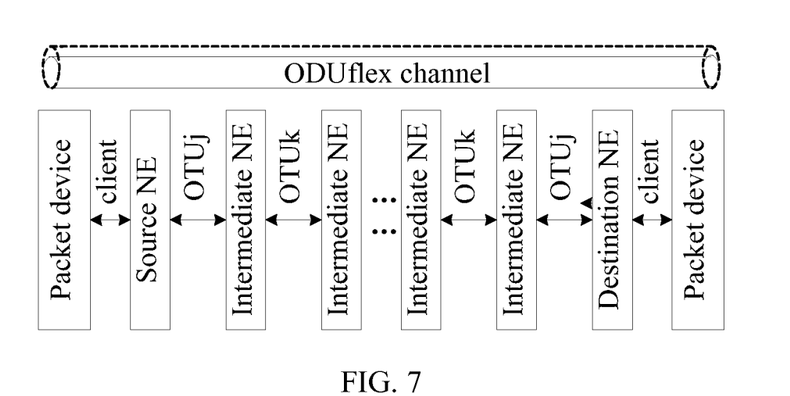
FIG. 7 is a structural diagram of an ODUflex channel according to an embodiment of the present disclosure.

As shown in FIG. 7, an embodiment of the present disclosure provides an ODUflex channel, which includes: a source network node, at least one intermediate network node and a destination network node. The source network node is configured to create bandwidth adjustment indication information and rate adjustment indication information, where the bandwidth adjustment indication information and the rate adjustment indication information are encapsulated in an HO ODU overhead or an ODUflex frame overhead and are transmitted to the intermediate network node and the destination network node.

The source network node, intermediate network node and destination network node are configured to respectively adjust, according to the bandwidth adjustment indication request information, a time slot occupied by an ODUflex frame in a Higher Order Optical Channel Data Unit at an egress side.

The source network node, intermediate network node and destination network node are configured to adjust, according to the rate adjustment indication information, a transmission rate of an ODUflex frame.

Figure 8:
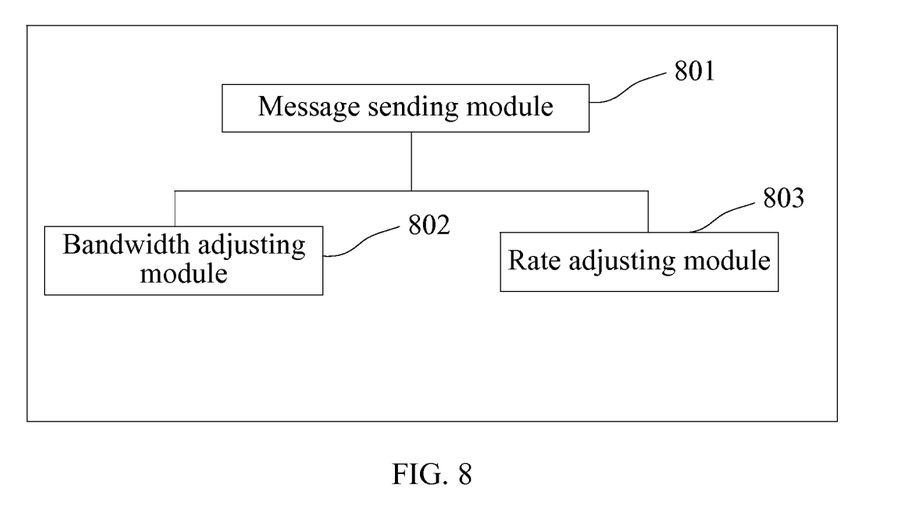
FIG. 8 is a structural diagram of a source network node in an ODUflex channel according to an embodiment of the present disclosure.

Further, referring to FIG. 8, the source network node includes:

a message sending module 801, configured to create the bandwidth adjustment indication request information and rate adjustment indication information and send the bandwidth adjustment indication request information and rate adjustment indication information;

a bandwidth adjusting module 802, configured to adjust, according to the bandwidth adjustment indication request information, a time slot occupied by an ODUflex frame in a Higher Order Optical Channel Data Unit at an egress side; and a rate adjusting module 803, configured to adjust, according to the rate adjustment indication information, a transmission rate of an ODUflex frame.

The ODUflex channel provided in the embodiment of the present disclosure adjusts a time slot occupied by an ODUflex frame in a Higher Order Optical Channel Data Unit at an egress side of each network node on an ODUflex channel and adjusts a transmission rate of an ODUflex frame of each network node on the ODUflex channel separately; and after the adjustment is completed, a source network node triggers change of packet service traffic, thereby achieving the lossless adjustment of ODUflex channel bandwidth.

Those of ordinary skills in the art should understand that all or a part of the steps of the method according to the embodiments of the present disclosure may be implemented by program instructing relevant hardware. The program may be stored in a computer readable storage medium, such as a Read-Only Memory (ROM), a Random-Access Memory (RAM), a magnetic disk, or an optical disk.

The above is only the specific implementation of the present disclosure, but the protection scope of the present disclosure is not limited thereto. Any change or replacement that can be easily derived by persons skilled in the art within the technical scope disclosed by the present disclosure shall fall within the protection scope of the present disclosure. Therefore, the protection scope of the present disclosure shall be subject to the protection scope of the claims.

What is claimed is:

1. In a source network node, a method of adjusting an Optical Channel Data Unit (ODU) flex channel bandwidth, the method comprising:

adjusting, according to bandwidth adjustment indication request information, the number of time slots occupied by an ODUflex frame in a Higher Order Optical Channel Data Unit (HO ODU), at an egress side of the source network node; and sending out, after the adjustment of the number of the time slots is completed, bandwidth adjustment indication request complete information.

2. The method according to claim 1, wherein the method further comprises:

adjusting, according to rate adjustment indication information, a transmission rate of the ODUflex frame of the source network node.

3. The method according to claim 2, wherein the method further comprises:

sending out a rate adjustment complete indication information which indicates that the adjustment of the transmission rate of the ODUflex frame of the source network node is completed.

4. The method according to claim 1, wherein the bandwidth adjustment indication request information is encapsulated into an overhead of the HO ODU or an ODUflex.

5. The method according to claim 2, wherein the rate adjustment indication information is encapsulated into an overhead of the HO ODU or an ODUflex.

6. In an intermediate network node or a destination network node, a method of adjusting an Optical Channel Data Unit (ODU) flex channel bandwidth, the method comprising:
   receiving bandwidth adjustment indication request information; and
   adjusting, according to the bandwidth adjustment indication request information, the number of time slots occupied by an ODUflex frame in a Higher Order Optical Channel Data Unit (HO ODU) at an egress side of the intermediate network node or the destination network node.

7. The method according to claim 6, wherein the method further comprises:
   receiving rate adjustment indication information; and
   adjusting, according to the rate adjustment indication information, a transmission rate of the ODUflex frame of the intermediate network node or the destination network node.

8. The method according to claim 6, wherein the method further comprises:
   sending out, after the adjustment of the number of the time slots is completed, bandwidth adjustment indication request complete information.

9. The method according to claim 6, wherein the bandwidth adjustment indication request information is encapsulated into an overhead of the HO ODU or the ODUflex.

10. The method according to claim 8, wherein the rate adjustment indication information is encapsulated into an overhead of the HO ODU or the ODUflex.

11. A network node device, comprising:
    a computing hardware; and
    a non-transitory computer-readable storage medium including computer-executable instructions executed by the computing hardware to perform operations comprising:
    adjusting, according to bandwidth adjustment indication request information, the number of time slots occupied by an ODUflex frame in a Higher Order Optical Channel Data Unit (HO ODU), at an egress side of the network node device; and
    sending out, after the adjustment of the number of the time slots is completed, bandwidth adjustment indication request complete information.

12. The network node device according to claim 11, wherein the operations further comprise:
    adjusting, according to rate adjustment indication information, a transmission rate of the ODUflex frame of the network node device.

13. The network node device according to claim 12, wherein the operations further comprise:
    sending out rate adjustment complete indication information which indicates that a rate adjustment of the network node device is completed.

14. The network node device according to claim 12, wherein the rate adjustment indication information is encapsulated into an overhead of the HO ODU or the ODUflex.

15. A network node device, comprising:
    a computing hardware; and
    a non-transitory computer-readable storage medium including computer-executable instructions executed by the computing hardware to perform operations comprising:
    receiving bandwidth adjustment indication request information; and
    adjusting, according to the bandwidth adjustment indication request information, the number of time slots occupied by an ODUflex frame in a Higher Order Optical Channel Data Unit (HO ODU), at an egress side of the network node.

16. The network node device according to claim 15, wherein the operations further comprise:
    receiving rate adjustment indication information; and
    adjusting, according to the rate adjustment indication information, a transmission rate of the ODUflex frame of the network node device.

17. The network node device according to claim 15, wherein the operations further comprise:
    sending out, after the adjustment of the number of the time slots is completed, bandwidth adjustment indication request complete information.

18. The network node device according to claim 17, wherein the rate adjustment indication information is encapsulated into an overhead of the HO ODU or the ODUflex.

* * * * *